United States Patent [19]

Eastman et al.

[11] Patent Number: 5,264,649
[45] Date of Patent: Nov. 23, 1993

[54] ALKYLATION CATALYST REGENERATION

[75] Inventors: Alan D. Eastman, Bartlesville, Okla.; Ronald G. Abbott, Kingwood, Tex.; Robert B. Eldridge; Fu-Ming Lee, both of Bartlesville, Okla.; David P. Mann, Katy, Tex.; Robert J. Mitchell, Bartlesville, Okla.

[73] Assignee: Phillips Petroleum Company, Bartlesville, Okla.

[21] Appl. No.: 991,060

[22] Filed: Dec. 15, 1992

[51] Int. Cl.⁵ .......................... C07C 2/62; C07C 7/10
[52] U.S. Cl. ..................... 585/802; 585/723; 585/724; 585/857
[58] Field of Search ............... 585/723, 724, 802, 857

[56] References Cited

U.S. PATENT DOCUMENTS

| | | | |
|---|---|---|---|
| 3,795,712 | 3/1974 | Torck et al. | 585/724 |
| 4,014,953 | 3/1977 | Brown, Jr. | 585/724 |
| 4,058,575 | 11/1977 | Cahn et al. | 585/724 |
| 4,189,616 | 2/1980 | Liebert | 585/701 |
| 4,199,409 | 4/1980 | Skraba | 585/724 |
| 4,316,998 | 2/1982 | Van Pool | 585/712 |
| 4,317,795 | 3/1982 | Makovec et al. | 422/62 |
| 4,663,026 | 5/1987 | Louie et al. | 585/723 |
| 4,861,447 | 8/1989 | Blytas et al. | 204/181.8 |
| 5,191,150 | 3/1993 | Child et al. | 585/809 |

Primary Examiner—Asok Pal
Attorney, Agent, or Firm—Charles W. Stewart

[57] ABSTRACT

Disclosed is a process for removing acid soluble oils, produced as an undesirable by-product of an HF catalyzed alkylation reaction, from a liquid containing a sulfone compound. The process includes the use of a solvent to extract the acid soluble oils from a sulfone-containing fluid that has previously been neutralized by a treating step.

14 Claims, 1 Drawing Sheet

ALKYLATION CATALYST REGENERATION

The present invention relates to the regeneration of a catalyst composition utilized in a hydrocarbon conversion process. More particularly, the invention relates to the regeneration of a catalyst mixture, comprising a sulfone compound and a hydrogen halide compound, utilized in the alkylation of olefin hydrocarbons by isoparaffin hydrocarbons.

BACKGROUND OF THE INVENTION

It has recently been discovered that a mixture, comprising a sulfone compound and a hydrogen halide compound, is an effective catalyst for use in the alkylation of olefin hydrocarbons by isoparaffin hydrocarbons to produce an alkylate reaction product, or alkylate. This discovery has been disclosed or claimed, or both, in several patent applications such as application Ser. No. 07/877,336 of Abbott and Randolph, filed May 1, 1992, and application Ser. No. 07/877,338 of Abbott et al, filed May 1, 1992. The alkylate reaction product generally contains hydrocarbons having seven or more carbon atoms, and it is a highly desirable gasoline blending component because of its high octane value as a motor fuel.

While a process which utilizes a catalyst composition comprising a sulfone component and a hydrogen halide component produces an alkylate product of very high quality, one side effect from using such a process in the production of alkylate is the formation of certain polymeric reaction by-products such as those referred to as acid-soluble oils, or ASO. These polymeric reaction by-products are referred to as acid-soluble oils because they are soluble in the catalyst utilized in the alkylation process and, thus, remain in the catalyst phase when the alkylate product resulting from the contact of a hydrocarbon mixture with an alkylation catalyst is separated from the alkylation catalyst. In an alkylation process which continuously separates the catalyst phase from the alkylation reaction product for reuse in the process reaction zone, there is a buildup of ASO in the catalyst. Over time the ASO concentration will reach unacceptable concentration levels if not removed. A low concentration of ASO in the alkylation catalyst comprising a sulfone component and a hydrogen halide component is believed to have a beneficial effect upon the alkylation process or its product. However, higher concentrations of ASO in the alkylation catalyst have an adverse effect upon the catalyst activity and the final alkylate end-product. An ASO concentration in the alkylation catalyst that exceeds certain acceptable limits will result in lowering the octane of the alkylate end-product with incremental increases in the ASO concentration causing incremental decreases in the alkylate octane.

In conventional continuous alkylation processes that use hydrogen fluoride (HF) as a catalyst, as opposed to the use of the aforementioned novel catalyst comprising a sulfone component and a hydrogen halide component, there are certain known methods used to remove the ASO from the HF catalyst. Particularly, enough of a portion of the HF catalyst that is utilized in the alkylation process is treated, or regenerated, so as to remove an amount of ASO at a rate that approximates the rate of accumulation of ASO in the alkylation catalyst. This is done by passing a portion of the HF catalyst to a stripping vessel whereby the HF is stripped from the ASO by means of a vaporous hydrocarbon such as isobutane with the HF passing as a part of the vaporous overhead stream from the stripping vessel and the ASO passing as a bottoms stream from the stripping vessel for further processing.

While the conventional alkylation catalyst regeneration techniques have worked well in the regeneration of the conventional HF catalyst, conventional means cannot be used to regenerate an alkylation catalyst mixture which includes a sulfone component. This is because the boiling range of ASO overlaps the boiling temperatures of certain sulfones such as sulfolane. Therefore, simple distillation techniques as are used to separate HF from ASO cannot be used to effectively regenerate a sulfone-containing alkylation catalyst. Additionally, it is necessary to separate ASO from the sulfone in order to reclaim the sulfone for reuse as a catalyst in the alkylation process.

SUMMARY OF THE INVENTION

It is, therefore, an object of this invention to provide a novel process for the regeneration of alkylation catalysts.

A further object of this invention is to provide a process for the removal of ASO from alkylation catalysts containing a sulfone component.

Thus, the process of the present invention relates to the regeneration of a sulfone-containing catalyst used in the alkylation of olefin hydrocarbons. A sulfone-containing mixture, comprising a hydrogen halide, a sulfone and ASO, is treated with a neutralizing compound to produce a neutralized sulfone-containing fluid. The neutralized sulfone-containing fluid is contacted with a solvent that is suitable for extracting at least a portion of the ASO contained in the neutralized sulfone-containing fluid and that suitably can produce an ASO rich extract and an ASO lean raffinate. At least a portion of the sulfone component of the ASO lean raffinate is separated so as to provide a sulfone stream, comprising the separated sulfone component, and an effluent stream.

Figure 1:
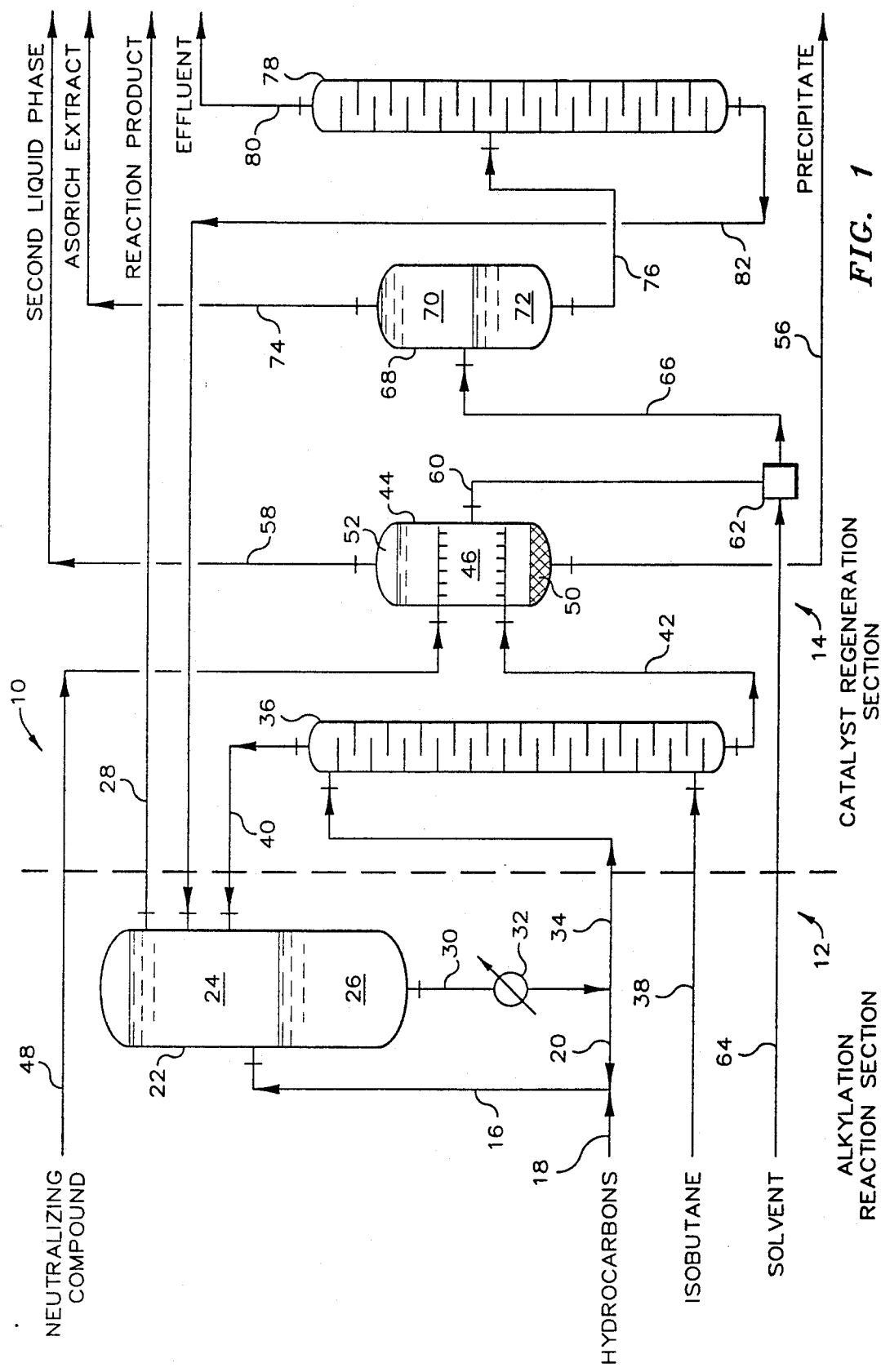
FIG. 1 provides schematic representation of the process which is one embodiment of the invention.

Other objects and advantages of the invention will be apparent from the foregoing detailed description of the invention and the appended claims.

DETAILED DESCRIPTION OF THE INVENTION

The acid soluble oil composition referred to herein is produced as a reaction by-product in an alkylation process comprising the step of contacting a hydrocarbon mixture, which comprises olefins and isoparaffins, with an alkylation catalyst, which comprises, consists of, or consists essentially of a hydrogen halide component and a sulfone component. As referred to within this description and in the claims, the term "acid soluble oil", or "ASO", means those conjunct polymers which are highly olefinic oils produced by acid-catalyzed reactions of hydrocarbons. An extensive description and characterization of certain types of conjunct polymer oils are provided in the *Journal of Chemical and Engineering Data* article entitled "Molecular Structure of Conjunct Polymers", pages 150–160, Volume 8, Number 1, by Miron and Lee. This article is incorporated herein by reference. The physical properties of ASO depend upon the particular hydrocarbon feed processed, the catalyst utilized in the process, feed contaminants such as hydrogen sulfide, butadiene, oxygenates and other compounds, and the alkylation process reaction conditions. Thus, as the term is more narrowly defined herein, ASO will be those conjunct polymers produced as a by-product in the catalyzed reaction of mono-olefins with isoparaffins utilizing a catalyst mixture comprising, consisting of, or consisting essentially of a sulfone component and a hydrogen halide component. The preferred mono-olefins for use in the catalyzed reaction are those having from three to five carbon atoms and the preferred isoparaffins are those having from four to six carbon atoms. The preferred sulfone component is sulfolane and the preferred hydrogen halide component is hydrogen fluoride.

The ASO by-product derived from the hydrocarbon reaction catalyzed by a sulfone-containing alkylation catalyst can further be generally characterized as having a specific gravity, with water at 60° F. as the reference, in the range of from about 0.8 to about 1.0, an average molecular weight in the range of from about 250 to about 350, and a bromine number in the range of from about 40 to about 350.

The hydrogen halide component of the catalyst composition or catalyst mixture can be selected from the group of compounds consisting of hydrogen fluoride (HF), hydrogen chloride (HCl), hydrogen bromide (HBr), and mixtures of two or more thereof. The preferred hydrogen halide component, however, is hydrogen fluoride, which can be utilized in the catalyst composition in anhydrous form; but, generally, the hydrogen fluoride component utilized can have a small amount of water. In a catalyst composition including hydrogen fluoride and sulfolane, the amount of water present in no event can be more than about 30 weight percent of the total weight of the hydrogen fluoride component, which includes the water. Preferably, the amount of water present in the hydrogen fluoride component is less than about 10 weight percent. Most preferably, the amount of water present in the hydrogen fluoride component is less than 7 weight percent. When referring herein to the hydrogen halide component, or more specifically to the hydrogen fluoride component, of the catalyst composition of the invention, it should be understood that these terms mean that the hydrogen halide component is either an anhydrous mixture or a non-anhydrous mixture. The references herein to weight percent water contained in the hydrogen halide component means the ratio of the weight of water to the sum weight of the water and hydrogen halide multiplied by a factor of 100 to place the weight ratio in terms of percent.

The sulfones suitable for use in this invention are the sulfones of the general formula

R—SO$_2$—R' wherein R and R' are monovalent hydrocarbon alkyl or aryl substituents, each containing from 1 to 8 carbon atoms. Examples of such substituents include dimethylsulfone, di-n-propylsulfone, diphenylsulfone, ethylmethylsulfone and the alicyclic sulfones wherein the SO$_2$ group is bonded to a hydrocarbon ring. In such a case, R and R' are forming together a branched or unbranched hydrocarbon divalent moiety preferably containing from 3 to 12 carbon atoms. Among the latter, tetramethylenesulfone or sulfolane, 3-methylsulfolane and 2,4-dimethylsulfolane are more particularly suitable since they offer the advantage of being liquid at process operating conditions of concern herein. These sulfones may also have substituents, particularly one or more halogen atoms, such as for example, chloromethylethylsulfone. These sulfones may advantageously be used in the form of mixtures.

The alkylation catalyst used in the alkylation process wherein an ASO reaction by-product is produced can comprise, consist of, or consist essentially of a hydrogen halide component as described herein and a sulfone component as described herein. Preferably, the ASO by-product will be produced in an alkylation process in which the hydrocarbon mixture is contacted with an alkylation catalyst having sulfolane as its sulfone component and hydrogen fluoride as its hydrogen halide component. In the case where the alkylation catalyst comprises sulfolane and hydrogen fluoride, good alkylation results can be achieved with weight ratio of hydrogen fluoride to sulfolane in the alkylation catalyst in the range of from about 1:1 to about 40:1. A preferred weight ratio of hydrogen fluoride to sulfolane can range from about 2.3:1 to about 19:1 and, more preferably, it can range from 3:1 to 9:1.

Alkylation processes contemplated in the present invention are those liquid phase processes wherein mono-olefin hydrocarbons such as propylene, butylenes, pentylenes, hexylenes, heptylenes, octylenes and the like are alkylated by isoparaffin hydrocarbons such as isobutane, isopentane, isohexane, isoheptane, isooctane and the like for production of high octane alkylate hydrocarbons boiling in the gasoline range and which are suitable for use in gasoline motor fuel. Preferably, isobutane is selected as the isoparaffin reactant and the olefin reactant is selected from propylene, butylenes, pentylenes and mixtures thereof for production of an alkylate hydrocarbon product comprising a major portion of highly branched, high octane value aliphatic hydrocarbons having at least seven carbon atoms and less than ten carbon atoms.

In order to improve selectivity of the alkylation reaction of the present invention toward the production of the desirable highly branched aliphatic hydrocarbons having seven or more carbon atoms, a substantial stoichiometric excess of isoparaffin hydrocarbon is desirable in the reaction zone. Molar ratios of isoparaffin hydrocarbon to olefin hydrocarbon of from about 2:1 to about 25:1 are contemplated in the present invention. Preferably, the molar ratio of isoparaffin-to-olefin will range from about 5 to about 20; and, most preferably, it shall range from 8 to 15. It is emphasized, however, that the above recited ranges for the molar ratio of isoparaffin-to-olefin are those which have been found to be commercially practical operating ranges; but, generally, the greater the isoparaffin-to-olefin ratio in an alkylation reaction, the better the resultant alkylate quality.

Alkylation reaction temperatures within the contemplation of the present invention are in the range of from about 0° F. to about 150° F. Lower temperature favor alkylation reaction of isoparaffin with olefin over competing olefin side reactions such as polymerization. However, overall reaction rates decrease with decreasing temperatures. Temperatures within the given range, and preferably in the range from about 30° F. to about 130° F., provide good selectivity for alkylation of isoparaffin with olefin at commercially attractive reaction rates. Most preferably, however, the alkylation temperature should range from 50° F. to 120° F.

Reaction pressures contemplated in the present invention may range from pressures sufficient to maintain reactants in the liquid phase to about fifteen (15) atmospheres of pressure. Reactant hydrocarbons may be normally gaseous at alkylation reaction temperatures, thus reaction pressures in the range of from about 40 pounds gauge pressure per square inch (psig) to about 160 psig are preferred. With all reactants in the liquid phase, increased pressure has no significant effect upon the alkylation reaction.

Contact times for hydrocarbon reactants in an alkylation reaction zone, in the presence of the sulfone-containing alkylation catalyst described herein, generally should be sufficient to provide for essentially complete conversion of olefin reactant in the alkylation zone. Preferably, the contact time is in the range from about 0.05 minute to about 60 minutes. In the alkylation process of the present invention, employing isoparaffin-to-olefin molar ratios in the range of about 2:1 to about 25:1, wherein the alkylation reaction mixture comprises about 40-90 volume percent catalyst phase and about 60-10 volume percent hydrocarbon phase, and wherein good contact of olefin with isoparaffin is maintained in the reaction zone, essentially complete conversion of olefin may be obtained at olefin space velocities in the range of about 0.1 to about 200 volumes olefin per hour per volume catalyst (v/v/hr.). Optimum space velocities will depend upon the type of isoparaffin and olefin reactants utilized, the particular compositions of alkylation catalyst, and the alkylation reaction conditions. Consequently, the preferred contact times are sufficient for providing an olefin space velocity in the range of about 0.1 to about 200 (v/v/hr.) and allowing essentially complete conversion of olefin reactant in the alkylation zone.

The alkylation process may be carried out either as a batch or continuous type of operation, although it is preferred for economic reasons to carry out the process continuously. It has been generally established that in alkylation processes, the more intimate the contact between the feedstock and the catalyst the better the quality of alkylate product obtained. With this in mind, the present process, when operated as a batch operation, is characterized by the use of vigorous mechanical stirring or shaking of the reactants and catalyst.

In continuous operations, in one embodiment, reactants may be maintained at sufficient pressures and temperatures to maintain them substantially in the liquid phase and then continuously forced through dispersion devices into the reaction zone. The dispersion devices can be jets, nozzles, porous thimbles and the like. The reactants are subsequently mixed with the catalyst by conventional mixing means such as mechanical agitators or turbulence of the flow system. After a sufficient time, the product can then be continuously separated from the catalyst and withdrawn from the reaction system while the partially spent catalyst is recycled to the reactor. As described herein, a portion of the catalyst can be continuously regenerated or reactivated by any suitable treatment and returned to the alkylation reactor.

The invention herein includes a process for separating or removing ASO from a sulfone-containing fluid mixture containing a hydrogen halide component, a sulfone component, and ASO. An important, if not critical, aspect of the inventive process is for there to be a step for treating the sulfone-containing fluid in order to remove at least a portion, preferably a substantial portion, of the hydrogen halide component prior to subjecting the thus treated sulfone-containing fluid or a neutralized sulfone-containing fluid to a solvent extraction step or steps so as to remove at least a portion of the ASO component contained therein. This treating step is important in that it has been found that a small concentration of hydrogen halide, particularly hydrogen fluoride, in the sulfone-containing fluid, which has a concentration of ASO, prevents otherwise suitable solvents for solubilizing ASO, such as, for example, the solvents of hydrocarbons, ethers, and carbon disulfide, from being effective solvents for removing ASO contained in sulfone-containing fluids. Thus, in order to remove ASO by solvent extraction methods from a sulfone-containing fluid, having a concentration of both ASO and hydrogen halide, a substantial portion of the hydrogen halide component must first be removed. Any suitable method or means can be used to remove at least a portion of the concentration of hydrogen halide contained in the sulfone-containing fluid. A preferred method, however, is to treat the sulfone-containing fluid with a neutralizing agent or compound that suitably converts at least a portion of the hydrogen halide contained in the sulfone-containing fluid into a salt compound to thereby neutralize the acidifying effects of the hydrogen halide. This treating or neutralizing step is performed by any means or method which suitably provides for the mixing or contacting of the sulfone-containing fluid with the neutralizing agent to provide a neutralized sulfone-containing fluid.

When mixing or contacting the neutralizing compound with the sulfone-containing mixture, any apparatus suitable for providing intimate mixing or contact can be used such as flow or line mixers and mechanically agitated vessels. Examples of flow or line type mixers include jet mixers, injectors, orifices, mixing nozzles, valves, pumps, agitated line mixers, static mixers, packed tubes, pipe lines and the like. The mechanically agitated vessels include such devices as vessels equipped with propellers or impellers utilized to accomplish mixing and dispersion. It is generally desirable to use a continuous type process whereby the neutralizing agent is continuously mixed with the sulfone-containing compound.

As earlier discussed herein, the inventive process contemplates the resolution of problems associated with the regeneration of sulfone-containing alkylation catalyst mixtures by the removal of at least a portion of the ASO contained within such mixtures to give a process for separating ASO from such sulfone-containing fluids. The accumulation of ASO in sulfone-containing alkylation catalysts occurs when an alkylation process continuously reuses its catalyst. In a continuous alkylation process, the ASO reaction by-product will build up in the catalyst until, if not removed, it reaches unacceptable concentration levels that can have negative effects upon the catalyst performance and, ultimately, the alkylation product quality itself. It is generally desirable to maintain the concentration of ASO in the sulfone-containing alkylation catalyst mixture at no more than about 20 weight percent of the catalyst with the weight percent ASO being based upon the total weight of the catalyst mixture exclusive of the ASO component. Preferably, the concentration of the ASO in the sulfone-containing alkylation catalyst is less than about 15 weight percent, and most preferably, the concentration of ASO is less than 10 weight percent. There may be some process advantages in maintaining a low concentration of ASO in the sulfone-containing catalyst mixture, but it is believed that an ASO concentration exceeding about 10 weight percent of the catalyst will have a detrimental effect upon the catalyst performance. Thus, in order to maintain the catalytic activity of a sulfone-containing alkylation catalyst mixture, the catalyst must be processed to remove at least a portion of the ASO contained within such catalyst.

It is desirable, however, for the hydrogen halide component of the ASO contaminated sulfone-containing alkylation catalyst mixture to be minimized before treating the resultant sulfone-containing mixture with the neutralizing compound to provide a neutralized sulfone-containing fluid. In particular, when a significant portion of the sulfone-containing alkylation catalyst mixture comprises hydrogen halide; for instance, when the weight ratio of hydrogen halide to sulfone is in the range of from about 1:1 to about 40:1, it is desirable for a portion, and preferably a major portion, of the hydrogen halide to be removed from the catalyst mixture to give the sulfone-containing mixture having a reduced concentration of hydrogen halide. This sulfone-containing mixture can comprise, consist of, or consist essentially of a sulfone component, a hydrogen halide component, and ASO. Generally, the concentration of the hydrogen halide component in the sulfone-containing mixture will be less than about 10 weight percent of the catalyst mixture with the weight percent determined by the weight fraction of the hydrogen halide to total weight of hydrogen halide and sulfone multiplied by a factor of 100 to yield a percent. Because it is very difficult to remove the entire amount of hydrogen halide from the catalyst mixture, the lower limit of hydrogen halide concentration can approach about 0.1 weight percent, but, preferably, the lower concentration limit of hydrogen halide can be less than 0.1 weight percent. Thus, the concentration range of hydrogen halide in the sulfone-containing mixture can range from about 0.1 weight percent to about 10 weight percent. Preferably, however, the concentration can range from about 0.1 to about 7.5 weight percent, and most preferably, it can range from 0.1 to 5.0 weight percent.

Once a portion of the hydrogen halide component of the sulfone-containing alkylation catalyst mixture is removed, the predominant component of the resultant sulfone-containing mixture is the sulfone compound. The amount of sulfone contained in the sulfone-containing mixture is that left after removing a portion of the hydrogen halide from the sulfone-containing alkylation catalyst mixture and, generally, will exceed about 70 weight percent of the total weight of the sulfone-containing mixture. The remaining fraction of the sulfone-containing mixture comprises the remaining hydrogen halide that has not been removed from the sulfone-containing alkylation catalyst and a significant portion, if not substantially all, of the ASO that is included in the sulfone-containing alkylation catalyst. It is preferred for the sulfone component of the sulfone-containing fluid to exceed about 80 weight percent of the sulfone-containing mixture; and, most preferably, the sulfone component should exceed 90 weight percent.

The step for treating the sulfone-containing fluid can utilize a neutralizing agent or compound that suitably converts the concentration of hydrogen halide contained in the sulfone-containing fluid to non-acidic compounds that preferably are soluble in the sulfone of the sulfone-containing fluid in at least the amounts and quantities that are of concern herein. It is preferred for the neutralizing compound to be a basic compound that is suitably reactive with the hydrogen halide component of the sulfone-containing fluid to give corresponding salt compounds. Generally, the preferred basic compounds for use as neutralizing agents are selected from the group consisting of potassium hydroxide, sodium hydroxide, ammonia and mixtures thereof. It is also preferred for the neutralizing agent to be in the form of an aqueous solution with the basic compound being present in the aqueous solution at a concentration range of from about 1 weight percent to about 20 weight percent of the solution, preferably from about 3 to about 15 weight percent, and most preferably from 5 to 10 weight percent. To achieve the best treating results, the quantity of neutralizing agent utilized in the treating step should be sufficient to convert at least a portion, and preferably a substantial portion, of hydrogen halide component of the sulfone-containing fluid to a salt compound that corresponds to the reaction product of hydrogen halide and the basic compound. For the solvent compounds described herein to be effective in removing ASO from the neutralized sulfone-containing fluid, it is important, if not essential, for the neutralized fluid to be substantially neutralized and free from acidic hydrogen halide components. Therefore, the ratio of neutralizing agent to sulfone-containing fluid used in the treating step will depend upon such factors as the concentration of hydrogen halide in the neutralized sulfone-containing fluid and the concentration of the basic compound in the aqueous solution utilized as a treating agent.

To remove at least a portion of the ASO contained in the neutralized sulfone-containing fluid, the neutralized sulfone-containing fluid undergoes a solvent extraction whereby at least a portion of the ASO contained in the neutralized sulfone-containing fluid is removed by contacting the neutralized sulfone-containing fluid with an ASO extraction solvent that is immiscible with the sulfone but in which ASO is soluble. Any solvent can be employed; provided, it can suitably extract at least a portion of the ASO that is contained in the neutralized sulfone-containing fluid from the neutralized sulfone-containing fluid, and it can suitably produce an ASO rich extract and an ASO lean raffinate. Examples of suitable ASO extraction solvents include hydrocarbons, such as, light paraffins, alkylate, and light cycle oils; ethers, such as, diethyl ether, methyl t-butyl ether, ethyl t-butyl ether, and methyl t-amyl ether; carbon disulfide; and water. It is preferred for the ASO extraction solvent to be selected from the group consisting of hydrocarbons, ethers, carbon disulfide and mixtures thereof.

Any means or method can be used which suitably provides for the mixing or contacting of the ASO extraction solvent with the neutralized sulfone-containing mixture to produce the ASO rich extract and ASO lean raffinate. The immiscible liquid phases of the ASO rich extract and ASO lean raffinate can subsequently be separated into their respective phases. Any separation means or method can be used which suitably provides for the separating of the ASO phase from the sulfone with water phase.

When mixing or contacting the ASO extraction solvent with the neutralized sulfone-containing mixture, any apparatus suitable for providing intimate mixing or contact can be used such as flow or line mixers and mechanically agitated vessels. Examples of flow or line type mixers include jet mixers, injectors, orifices, mixing nozzles, valves, pumps, static mixers, agitated line mixers, packed tubes, pipe lines and the like. The mechanically agitated vessels include such devices as vessels equipped with propellers or impellers utilized to accomplish mixing and dispersion.

It is generally desirable to use a continuous type process whereby the ASO extraction solvent is continuously mixed with the neutralized sulfone-containing mixture followed by a separation of the resultant ASO rich extract phase and ASO lean raffinate phase by any means or method which suitably provides for separating the two immiscible liquid phases. In the continuous process, it is common for the mixing or contacting step to be performed separately, and by a separate apparatus, from that of the separating step. Flow or line mixers provide suitable means for mixing in a continuous process.

The mixing and separating steps can also be conducted in a batchwise fashion usually in a single vessel which defines both a mixing zone and a separation zone. Mechanically agitated vessels can be utilized as apparatus to permit the batchwise mixing of the ASO extraction solvent and the neutralized sulfone-containing mixture and separating of the resulting ASO rich extract and the ASO raffinate phases.

As for the separation of the immiscible liquid phases, a vessel, which defines a separation zone, can suitably be used; provided, it has the appropriate volume to permit the separation of the immiscible fluids by gravity or any other appropriate means. Other mechanical devices, such as, for example, centrifuges, can be used to perform the separation of the immiscible phases.

Any amount of the ASO extraction solvent relative to the quantity of the neutralized sulfone-containing mixture can be utilized in the process; provided, that, the amount of the ASO extraction solvent mixed with the neutralized sulfone-containing mixture is sufficient for causing the subsequent formation of two immiscible, liquid phases including ASO rich extract phase and ASO lean raffinate phase. The ASO lean raffinate phase can comprise: at least a portion of the sulfone of the neutralized sulfone-containing fluid, at least a portion of the water of the neutralizing agent, at least a portion of the salt compounds produced in the step for treating the sulfone-containing fluid, and optionally, it can include at least a portion of the basic compound of the neutralizing agent. The ASO rich extract can comprise at least a portion of the ASO extraction solvent and at least a portion of the ASO component contained in the neutralized sulfone-containing mixture. Generally, it is desirable to mix an amount of ASO extraction solvent with the neutralized sulfone-containing mixture such that the volumetric ratio of the ASO extraction solvent to neutralized sulfone-containing fluid is in the range of from about 1:10 to about 10:1; but, preferably, the volumetric ratio can be in the range of from about 1:5 to about 5:1; and, most preferably, the volumetric ratio can be in the range of from 1:2 to 2:1.

For the best process results, it is advantageous for the ASO extraction solvent to remove or extract from the neutralized sulfone-containing fluid a significant portion of the ASO contained therein to give the ASO rich extract. The ASO rich extract, which comprises at least a portion of the ASO extraction solvent and at least a portion of the ASO contained in the neutralized sulfone-containing fluid, should contain greater than about 50 weight percent of the ASO included in the neutralized sulfone-containing fluid; but, preferably, the amount of ASO extracted from the neutralized sulfone-containing fluid by the ASO extraction solvent should exceed about 60 weight percent of the ASO contained in the neutralized sulfone-containing fluid. Most preferably, the ASO extracted from the neutralized sulfone-containing fluid can exceed 75 weight percent of the ASO contained therein.

The ASO lean raffinate can comprise: at least a portion of the sulfone component of the neutralized sulfone-containing fluid, at least a portion of the water of the reaction product produced by the neutralization reaction of the treating or neutralization step, as well as at least a portion of the water comprising the aqueous neutralization solution, at least a portion of the reaction salts produced during the treating step, and at least a portion of the unreacted neutralization agent. It is desirable for the ASO lean raffinate to contain a minimal concentration of the unreacted neutralization compound as well as having a minimal concentration of hydrogen halide. To achieve this, however, it is necessary for the process conditions of the treating step to be controlled in a manner such that both the hydrogen halide and unreacted neutralization agent concentration in the ASO lean raffinate are minimized. It is advantageous for the amount of the salt compound in the ASO lean raffinate, produced as a result of the neutralization reaction of the treating step, to not exceed its solubility limit in the sulfone. Thus, in order to prevent this, the amount of salt compound produced during the treating step that exceeds that which is soluble in the sulfone of the neutralized sulfone-containing fluid is precipitated and separated during the treating step or by any other means suitable for separating the precipitate.

The process conditions under which the ASO extraction solvent and neutralized sulfone-containing mixture can be mixed or contacted include mixing or contacting temperatures in the range of from about 0° F. to about 250° F., with 40° F. to 260° F. being preferred. The mixing or contacting pressures include those within the range of from about 0.5 atmospheres of absolute pressure to about 30 atmospheres of absolute pressure, with 0.95 atmospheres of absolute pressure to 25 atmospheres of absolute pressure being preferred. As for the process conditions under which the ASO rich extract phase and ASO lean raffinate phase are separated, the separating temperature can range from about 0° F. to about 250° F., with 40° F. to 260° F. being preferred. The separating pressures can range from about 0.5 atmospheres of absolute pressure to about 30 atmospheres of absolute pressure with preferred separating pressures being in the range of from 0.95 atmospheres of absolute pressure to 25 atmospheres of absolute pressure.

The ASO lean raffinate phase can further be processed to remove at least a portion of the water, salt compound, and unreacted neutralization agent contained therein by any means suitable for removing or separating water and other components from the sulfone of the ASO lean raffinate phase to thereby form a sulfone stream and an effluent stream. For the best performance of the process, it is advantageous to remove a substantial portion of the water contained in the ASO lean raffinate phase to produce the sulfone stream having a concentration of water of less than about 5 volume percent, but preferably, less than about 3 volume percent. Thus, the process step for separating the sulfone from the ASO lean raffinate will produce two streams: a sulfone stream and an effluent stream. The sulfone stream comprises at least a portion of the sulfone contained in the ASO lean raffinate, and preferably, a significant portion of the sulfone component of the ASO lean raffinate. The effluent stream comprises at least a portion, and preferably a significant portion, of the water component of the ASO lean raffinate. Because the salt compounds and unreacted neutralizing compounds are substantially soluble in water, a portion, if not a significant portion, of these components of the ASO lean raffinate will be dissolved in the effluent stream thus giving an effluent stream that can comprise: at least a portion of the water contained in the aqueous solution utilized in the treating step, at least a portion of the salt compound produced during the treating step, and, optionally, at least a portion of the neutralizing compound utilized during the treating step but which remained unreacted during such step. It is preferred, however, for substantially all of these components to remain in the effluent stream.

Now referring to FIG. 1, there is depicted by schematic representation a process 10 which includes an alkylation reaction section 12 and a catalyst generation section 14. A hydrocarbon feed mixture, comprising olefins and isoparaffins, is introduced into riser-reactor 16 through conduit 18. Riser-reactor 16 defines a reaction zone wherein the hydrocarbon feed mixture is contacted, or admixed, with a sulfone-containing alkylation catalyst, which comprises sulfolane and hydrogen fluoride, to thereby produce an alkylation reaction mixture comprising an alkylate product, ASO and the sulfone containing alkylation catalyst. The olefins of the hydrocarbon feed mixture generally comprise one or more olefins having from three to five carbon atoms, and the isoparaffins of the hydrocarbon feed mixture generally will have from four to six carbon atoms. The sulfone-containing alkylation catalyst is introduced into riser-reactor 16 via conduit 20. The admixture of hydrocarbon feed mixture and sulfone-containing alkylation catalyst passes through the reaction zone defined by riser-reactor 16 wherein a reaction takes place in which the olefins of the hydrocarbon feed mixture react with isoparaffins of the hydrocarbon feed mixture to produce an alkylate product. Also, within the reaction zone, the reaction by-product, ASO, is formed. The alkylation reaction mixture or reaction effluent from riser-reactor 16 comprises the alkylate product, ASO, and the sulfone-containing alkylation catalyst and passes to settler vessel 22, which defines a separation zone for separating the alkylate product from the alkylation reaction mixture to produce a separated reaction product 24 and a separated sulfone-containing alkylation catalyst 26. The separated sulfone-containing alkylation catalyst will contain a substantial amount of the alkylation reaction by-product, ASO. The separated reaction product 24 passes downstream by way of conduit 28 for further processing. The separated sulfone-containing alkylation catalyst 26 can be recycled via conduits 30 and 20 to riser-reactor 16 for reuse as the sulfone-containing alkylation catalyst. Interposed in conduit 30 is catalyst cooler 32, which defines a heat transfer zone for exchanging heat from separated sulfone-containing alkylation catalyst 26 to a heat transfer fluid such as water.

At least a portion, sometimes referred to as a slip stream or a drag stream, of the separated sulfone-containing alkylation catalyst 26 passes by way of conduit 34 to stripping column 36, which defines a separation zone for separating the slip stream of separated sulfone-containing alkylation catalyst into an overhead stream, or hydrogen fluoride stream, comprising a major portion of the hydrogen fluoride contained in the slip stream, and a bottoms stream, comprising a major portion of the sulfone component of the slip stream. The bottoms stream will also contain a major portion of the reaction by-product, ASO, contained in the slip stream. Introduced by way of conduit 38 is vaporous isobutane for stripping the hydrogen fluoride from the slip stream. The overhead stream passes by way of conduit 40 to settler vessel 22 wherein the hydrogen fluoride is recombined for reuse with the separated sulfone-containing alkylation catalyst 26, and the stripping isobutane is combined with the separated reaction product 24.

The bottoms stream from stripping column 36 passes by way of conduit 42 to mixing means 44, which defines a mixing zone for mixing the bottoms stream or sulfone-containing fluid stream with a neutralizing compound to thereby form a neutralized sulfone-containing fluid 46. The neutralizing compound is provided to the mixing zone defined by mixing means 44 through conduit 48. In mixing means 44, the sulfone-containing fluid stream is intimately mixed or contacted with the neutralizing compound so that substantially all of the hydrogen halide in the sulfone-containing fluid stream reacts with the neutralizing compound to form salt compounds. In most instances, the amounts of neutralizing compound utilized and reaction products formed during the step for treatment of the sulfone-containing fluid with the neutralizing compound will be small enough to assure that a single neutralized sulfone-containing fluid phase is formed. Thus, the single neutralized sulfone-containing fluid phase will have dissolved therein essentially all the reaction products resulting from the neutralization step and any unreacted neutralization compounds. However, in other instances, it is possible, when a sufficiently large amount of neutralizing compound is used, for more than one liquid phase to form during the step for treating the sulfone-containing fluid. Thus, under certain, but non-preferred, operating conditions a solid precipitate phase 50 can form, which comprises a salt compound, and a second liquid phase 52, which comprises the neutralizing compound, can form. The precipitate phase 50 passes to downstream processing by way of conduit 56 and the second liquid phase 52 passes downstream by way of conduit 58. The resultant neutralized sulfone-containing fluid then passes by way of conduit 60 to mixing means 62, which defines a mixing zone for mixing the neutralized sulfone-containing fluid with an ASO extraction solvent. The ASO extraction solvent is introduced into mixing means 62 by way of conduit 64.

The mixture of ASO extraction solvent and neutralized sulfone-containing fluid passes by way of conduit 66 to phase separator 68 which defines a separation zone for separating an ASO rich extract 70 and an ASO lean raffinate 72. The ASO rich extract 70 passes downstream by way of conduit 74 and the ASO lean raffinate passes via conduit 76 to fractionator 78 which defines a separation zone and provides means for separating the ASO lean raffinate into a sulfone stream, which comprises at least a portion of the sulfone contained in the ASO lean raffinate, and an effluent stream. The effluent stream passes from fractionator 78 via conduit 80 to downstream processing. The sulfone stream passes from fractionator 78 by way of conduit 82 to settler vessel 22 wherein it is combined with the separated sulfone-containing alkylation catalyst.

The following examples demonstrate the advantages of the present invention. These examples are by way of illustration only, and are not intended as limitations upon the invention as set out in the appended claims.

EXAMPLE I

This example is provided to demonstrate the need to neutralize the hydrogen fluoride contained in a mixture of ASO and sulfolane in order to separate the ASO and sulfolane components. Ten mixtures containing neutralized acid soluble oil, anhydrous sulfolane and hydrogen fluoride were studied and are presented in Table I. Qualitative, as opposed to quantitative, observations of the experiments are summarized in Table I. Because of the highly chromophoric nature of acid soluble oil, separation of the acid soluble oil phase was clearly distinguishable from negative results. It is noted that, based on the observations presented in Table I, no phase separation occurs when the mixture of ASO and sulfolane is an acidified mixture.

TABLE 1

| # | Ingredients | v/v Ratio | Observations |
|---|---|---|---|
| 1 | ASO[1]/sulfolane | 1:1 | Phase separation: brown ASO layer (top), brown sulfolane layer (bottom). |
| 2 | ASO/sulfolane/water | 1:1:1 | Very clear phase separation. Upper brown (ASO) layer with yellow (nearly ASO free) lower aqueous sulfolane layer |
| 3 | ASO/water | 1:1 | Completely immiscible; colorless lower phase |
| 4 | ASO/sulfolane + 2 drops 60/40 HF/sulfolane[2]* | 1:1 | No phase separation |
| 5 | ASO/sulfolane, 2 drops 60/40 HF/sulfolane* + a ¼" alumina bead | 1:1 | No phase separation |
| 6 | ASO/sulfolane, 2 drops 60/40 HF/sulfolane* + a ¼" diameter KOH pellet | 1:1 | No phase separation |
| 7 | ASO/sulfolane/water + 2 drops 60/40 HF/sulfolane* | 1:1:1 | Very clear phase separation. Upper brown (ASO) layer with colorless (ASO free) lower aqueous sulfolane layer |
| 8 | 60/40 HF/sulfolane* + water | 1:1 | Partial phase separation. Brown aqueous layer, brown ASO layer |
| 9 | 60/40 HF/sulfolane* + water | 1:4 | Partial phase separation |
| 10 | 60/40 HF/sulfolane* + water + enough KOH to neutralize solution | 1:1 | Excellent phase separation[3] |

[1] Unless otherwise specified, ASO indicates completely neutralized acid soluble oil.
[2] The "2 drops" are not added into the v/v ratio, but are intended to slightly acidify the sulfolane/ASO mixture.
[3] If a large excess of KOH is added, sulfolane will precipitate from the aqueous phase as round, slightly brown beads.
*The 60/40 HF/sulfolane material is spent catalyst from an alkylation run containing 1-2 percent ASO.

EXAMPLE II

This example describes qualitative experiments which demonstrate the necessity for using a solvent for extracting ASO from a sulfolane material.

A spent 60/40 HF/sulfolane catalyst mixture containing ASO from a continuous alkylation reaction, which had been operated 27 hours, was used in this experiment. Initially, the catalyst was a royal purple color. HF vapor was noted to slowly evolve from the mixture. Hydrogen fluoride was removed from approximately 20 mL of this mixture by placing it in a 100 mL nickel crucible and heating it at 150° F. for 10 hours with gentle mechanical stirring. The resultant material was a brown, acidic homogeneous solution. This solution was then heated to 250° F. for three hours, at which time, the solution was determined to be neutral by litmus paper test. The resulting neutral brown mixture was then split into 4 identical samples for the remaining procedure.

The brown mixture was immediately placed into a glass screwcap vial and allowed to cool to room temperature. The result was a solid brown homogeneous material with a melting point essentially identical to that of sulfolane.

This sample was treated in an identical manner to that above except it was not isolated from the atmosphere. The resulting mixture was a homogeneous brown liquid resembling wet sulfolane.

A 1:1 volumetric ratio of water and the aforementioned brown sulfolane/ASO mixture were combined in a glass vial. The result was a slightly colored aqueous phase and, surprisingly, a brown flocculant precipitated ASO phase.

Again this was repeated except for the addition of 0.2 g KOH to the mixture of water and sulfolane/ASO. The result in this case was a deep brown oily precipitate (ASO phase) and a slightly brown aqueous phase.

EXAMPLE III

This example is provided to demonstrate the effectiveness of various solvents for the extraction of ASO from sulfolane. The data presented in Table II are qualitative by nature and are based on visual observations.

Sulfolane, ASO, water and an extractant were combined to determine the relative extraction capabilities of each of five solvents of: methylcylopentane, cyclohexane, dicyclopentadiene, alkylate (85% isooctane), MTBE and diethylether. In each case, 1 mL sulfolane, 1 mL water, 0.25 mL neutralized ASO and 1 mL extractant were combined, shaken vigorously for 30 seconds and then allowed to undergo phase separation. In each case, the liquid phases were evaluated visually for ease of ASO separation from the aqueous phase. These observations are summarized in Table II.

TABLE II

| Extractant | Observations |
|---|---|
| methylcyclopentane | excellent, immediate phase separation |
| cyclohexane | excellent, immediate phase separation |
| alkylate | slightly slower but effective phase separation |
| MTBE | excellent, immediate phase separation |
| dicyclopentadiene | No immediate separation; slight phase separation after 30 minutes. |

The use of paraffins or ethers promotes very good phase separation. Dicyclopentadiene and aromatics are believed to be far less effective. In the absence of water, essentially no phase separation occurs.

EXAMPLE IV

This example illustrates the separation of ASO from sulfolane by solvent extraction.

A 75 mL sample of approximate concentrations of 35% HF, 55% sulfolane and 10% ASO was heated to 200° F. for 4 hours to remove the majority of HF in the catalyst. A 16.56 g aliquot of this nearly neutralized catalyst was added to 10.84 g water, 0.4 g NaOH$_{(s)}$ and 7.37 g n-pentane (extractant). This mixture was agitated vigorously and was allowed to settle, resulting in a deep brown upper (organic) phase and a colorless aqueous phase. The resulting n-pentane/ASO phase was isolated for further evaluation and split into two samples (A&B).

A. One Water Wash

With no further treatment, the n-pentane was removed by heating, and the resulting brown, viscous acid soluble oil was evaluated for sulfolane content. The results indicated 4.7 wt. % sulfolane in the ASO sample (or a 95.3% sulfolane removal efficiency).

B. Two Water Washes

A 2.5 g sample of n-pentane/ASO solution was combined with 9.0 g water and vigorously agitated as before. The phases were allowed to separate, resulting in a brown upper phase and a colorless lower phase as before. The n-pentane phase was isolated, the n-pentane was removed and the resulting brown, viscous ASO product was evaluated for sulfolane content. The results showed only 1.7% sulfolane, or a 98.3% sulfolane removal efficiency from the ASO.

EXAMPLE V

This example illustrates the use of pyridine as a neutralizing agent.

A 10 g mixture of approximately 5% HF, 85% sulfolane and 10% ASO was added to a vial containing 5 g pyridine, 10 g water and 6 g n-pentane. The mixture was shaken (allowing for venting of n-pentane vapor from the resulting exothermic reaction) and allowed to settle. Water was found to be important for efficient phase separation to occur. The organic phase was dark brown, and the aqueous phase was slightly yellow. The n-pentane phase was removed, and a second 6 g aliquot of n-pentane was added to extract and isolate more ASO. The n-pentane fractions were combined, heated to 100° F. (to remove n-pentane) and then heated to 250° F. to remove small amounts of pyridine in the ASO. A sulfur analysis showed 1.12% sulfolane in the product ASO, indicating nearly 90% sulfolane separation from the ASO byproduct.

While this invention has been described in terms of the presently preferred embodiment, reasonable variations and modifications are possible by those skilled in the art. Such variations and modifications are within the scope of the described invention and the appended claims.

That which is claimed is:

1. A process for separating acid soluble oil, hereinafter called ASO from a sulfone-containing fluid comprising a hydrogen halide, a sulfone and ASO, the steps comprising:
   (a) treating said sulfone-containing fluid with a neutralizing compound to produce a neutralized sulfone-containing fluid wherein said neutralized sulfone-containing fluid comprises said sulfone and ASO;
   (b) contacting said neutralized sulfone-containing fluid with a solvent suitable for extracting at least a portion of the ASO that is contained in said neutralized sulfone-containing fluid from said neutralized sulfone-containing fluid and for producing an ASO rich extract and an ASO lean raffinate;
   (c) separating said ASO rich extract from said ASO lean raffinate; and
   (d) separating said sulfone from said ASO lean raffinate to form a sulfone stream and an effluent stream wherein said sulfone stream comprises at least a portion of said sulfone contained in said ASO lean raffinate.

2. A process as recited in claim 1 wherein said neutralizing compound is an aqueous solution of a basic compound selected from the group consisting of potassium hydroxide, sodium hydroxide, ammonia and mixtures thereof.

3. A process as recited in claim 2 wherein said solvent is selected from the group consisting of hydrocarbons, ethers, carbon disulfide and mixtures thereof.

4. A process as recited in claim 3 wherein said aqueous solution has a concentration of said basic compound in the range of from about 1 weight percent to about 20 weight percent.

5. A process as recited in claim 4 wherein in said treating step (a) said neutralizing compound is contacted with said sulfone-containing fluid and wherein the amount of said neutralizing compound utilized is such as to convert at least a portion of the hydrogen halide contained in said sulfone-containing fluid to a salt compound that corresponds to the reaction product of said hydrogen halide and said basic compound.

6. A process as recited in claim 5 wherein the amount of said neutralizing compound utilized in said treating step (a) is such that said neutralized sulfone-containing fluid is a single liquid phase comprising said sulfone, ASO, water and said salt compound.

7. A process as recited in claim 6 wherein the volumetric ratio of said solvent to said neutralized sulfone-containing fluid utilized in said contacting step (b) is in the range of from about 1:10 to about 10:1.

8. A process a recited in claim 7 wherein said ASO rich extract and said ASO lean raffinate are immiscible liquid phases and wherein said ASO rich extract comprises at least a portion of said solvent and at least a portion of the ASO contained in said neutralized sulfone-containing fluid and said ASO lean raffinate comprises at least a portion of said sulfone of said neutralized sulfone-containing fluid and at least a portion of the water of said neutralizing compound.

9. A process as recited in claim 8 wherein said ASO rich extract contains greater than 50 weight percent of the ASO contained in said neutralized sulfone-containing fluid.

10. A process as recited in claim 9 wherein said sulfone-containing fluid includes:
    a concentration of ASO upwardly to about 25 weight percent, and
    a concentration of said hydrogen halide upwardly to about 10 weight percent.

11. A process as recited in claim 10 wherein said hydrogen halide is hydrogen fluoride and said sulfone is sulfolane.

12. A process as recited in claim 11 wherein the amount of said at least a portion of said sulfone of said sulfone stream is upwardly to 99 weight percent of said sulfone of said sulfone-containing fluid.

13. A process as recited in claim 12 wherein said effluent stream comprises at least a portion of the water contained in said aqueous solution and at least a portion of said salt compound.

14. A process for separating ASO from a sulfone-containing fluid comprising HF, ASO, and a sulfone, the steps comprising:
    a) treating said sulfone-containing fluid with a neutralizing compound to produce a neutralized sulfone-containing fluid;

b) contacting said neutralized sulfone-containing fluid with a solvent suitable for extracting at least a portion of the ASO that is contained in said neutralized sulfone-containing fluid from said neutralized sulfone-containing fluid and for producing an ASO rich extract and an ASO lean raffinate;

c) separating said ASO rich extract from said ASO lean raffinate;

d) separating said ASO rich extract into a sulfone stream and a solvent stream;

e) utilizing said sulfone stream and at least a portion of a sulfone-containing alkylation catalyst comprising said sulfone and HF;

f) contacting a hydrocarbon mixture, comprising olefins and isoparaffins, with said sulfone-containing alkylation catalyst within a reaction zone to thereby produce an alkylation reaction mixture comprising an alkylate product, ASO, and said sulfone-containing alkylation catalyst;

g) separating said alkylate product from said alkylation reaction mixture within a first separation zone to produce a separated reaction product and a separated sulfone-containing alkylation catalyst wherein said separated reaction product comprises a portion of said alkylate product and said separated sulfone-containing alkylation catalyst comprises a portion of the ASO produced by said contacting step (f);

h) optionally utilizing said separated sulfone-containing alkylation catalyst as at least a portion of said sulfone-containing alkylation catalyst;

i) separating at least a portion of said separated sulfone-containing alkylation catalyst into a hydrogen fluoride stream comprising hydrogen fluoride and said sulfone-containing mixture; and j) utilizing said hydrogen fluoride stream as at least a portion of said sulfone-containing alkylation catalyst.

* * * * *